United States Patent
Baud et al.

(10) Patent No.: US 9,525,315 B2
(45) Date of Patent: Dec. 20, 2016

(54) MAGNET TILES ASSEMBLY

(71) Applicant: Portescap SA, La Chaux-de-Fonds (CH)

(72) Inventors: Cyril Baud, Les Fins (FR); Johnny Carlino, Le Locle (CH); Alexis Montagnat-Rentier, Le Ferriére (CH)

(73) Assignee: PORTESCAP SA, La Chaux-de-Fonds (CH)

( * ) Notice: Subject to any disclaimer, the term of this patent is extended or adjusted under 35 U.S.C. 154(b) by 136 days.

(21) Appl. No.: 14/571,936

(22) Filed: Dec. 16, 2014

(65) Prior Publication Data

US 2015/0236554 A1 Aug. 20, 2015

Related U.S. Application Data

(60) Provisional application No. 61/941,567, filed on Feb. 19, 2014.

(51) Int. Cl.
*H02K 1/27* (2006.01)
*H02K 1/17* (2006.01)

(52) U.S. Cl.
CPC .............. *H02K 1/278* (2013.01); *H02K 1/17* (2013.01); *H02K 1/27* (2013.01)

(58) Field of Classification Search
CPC ............. H02K 1/27; H02K 1/278; H02K 1/17

IPC ...................... H02K 1/27, 1/278, 1/17
See application file for complete search history.

(56) References Cited

U.S. PATENT DOCUMENTS

| | | | | |
|---|---|---|---|---|
| 4,748,359 A * | 5/1988 | Yahara | ................ | H02K 1/278 310/156.13 |
| 5,679,995 A | 10/1997 | Nagate et al. | | |
| 5,789,831 A * | 8/1998 | Kregling | ................ | H02K 1/278 29/598 |
| 2001/0010440 A1 * | 8/2001 | Ortt | ................ | H02K 1/17 310/154.08 |

FOREIGN PATENT DOCUMENTS

| CN | 101964236 | 2/2011 |
|---|---|---|
| EP | 0 657 984 | 6/1995 |

* cited by examiner

*Primary Examiner* — Dang Le
(74) *Attorney, Agent, or Firm* — Brinks Gilson & Lione; G. Peter Nichols

(57) ABSTRACT

A magnet assembly includes at least one support member, a plurality of magnets, wherein each one of the plurality of magnets is positioned relative to the at least one support member by a male-female interface. For each one of the plurality of magnets, a male portion is engaged into a female portion so that displacements during a step of attachment of each one of the plurality of magnets to the at least one support member are avoided.

8 Claims, 3 Drawing Sheets

MAGNET TILES ASSEMBLY

This application claims priority to U.S. Provisional application No. 61/941,567 filed Feb. 19, 2014, the entire contents of which is incorporated herein by reference.

BACKGROUND

The present invention relates to a magnet assembly for an electric motor, and in particular is directed to, but not limited to, a magnet assembly for a brushless direct current motor. Brushless direct current motors generally comprise permanent magnets attached onto their rotor.

SUMMARY

A typical arrangement of magnets onto a rotor for a brushless direct current motor is shown on FIG. 1a. The magnets are attached onto the shaft, but due to the permanent magnetic forces, movements of the magnets may occur during the steps of manufacturing, thereby displacing the magnets from their theoretical positions, leading to dimensional spreads, balancing issues and magnetic field imbalance (in a motor, it is important that the magnetic field exhibit a regular angular symmetry). A typical defect of assembly is represented on FIG. 1b, where the magnets are not regularly spaced, thereby leading to an imbalanced gap between the magnets and asymmetric magnetic field.

As an alternative to the above known arrangement, the document EP0657984A1 discloses a rotor for a brushless direct current motor having magnets positioned in slots of the rotor. However, this arrangement is leading to significant loss of the magnetic force, and is not compatible with a reduction of size, as the slots and magnets need a minimum size to comply with manufacturing constraints.

The present invention aims to solve these aforementioned drawbacks and is first directed to propose a magnet assembly for an electric motor easy to manufacture, and enabling a correct positioning of the magnets, even during a step of assembly where the permanent attraction/repulsion forces of the magnets may provoke displacements of the magnets.

With this goal in mind, a first aspect of the invention is a rotor of an electric motor comprising the rotor and a stator, the rotor comprising:

at least one support member, a plurality of magnets attached to and covering one outer surface of the at least one support member, the said plurality of magnets being adjacent to an air gap between the rotor and the stator, characterized in that:

one of the said outer surface of said support member and each of the said plurality of magnets comprises at least one male portion, the other of the said outer surface of said support member and each of the said plurality of magnets comprises at least one female portion, and in that the at least one male portion is engaged into the at least one female portion, thereby providing a positioning of each of the said plurality of magnets to the at least one support member, at least during a step of attachment of each of the said plurality of magnets to the at least one support member. The rotor according to the present invention comprises at least a male portion engaged into at least one female portion for each magnet, so that each magnet of the plurality of magnets is provided with a mechanical positioning (by abutment and/or locator) onto the support member. The unexpected displacements before or during attachment onto the support member are therefore reduced and/or eliminated.

Advantageously, the at least one male portion is an edge, and the at least one female portion is a cutout which is complementary to the edge. According to this embodiment, an edge is provided as being the male portion, meaning that this edge is a protrusion. Such edge is easily formed by two intersecting planar faces, but not limited to such embodiment. The invention is not limited to sharp edges: chamfers, radiuses between two intersecting faces are also suitable for carrying out the invention.

Advantageously, the at least one male portion is providing an abutment onto the at least one support member for each one of the plurality of magnets, in a direction of application of a magnetic force created by the other magnets of the plurality of magnets. In other words, the male portion engaged into the female portion allows only one degree of freedom between each magnet and the support member, or at least block degrees of freedom in the direction of application of the magnetic force, before definitive attachment between these components.

Advantageously, the plurality of magnets is a plurality of magnet tiles. The invention facilitates the assembly of tiles, as they cannot be inserted in slots or in holes, because it is necessary that they cover the support member, to maximize the magnetic field (which should have a regular angular shape). Consequently, only one side of each magnet is available to provide an interface with the at least one support member, as the other side is a boundary of the air gap. Implementing the male or female portion on one side is possible without affecting the other side of the magnet delimitating the air gap of the motor.

Advantageously, the at least one support member is a shaft of the rotor, having an elongated attachment portion for the plurality of magnets, with a polygonal cross section. The shaft according to the present embodiment has a polygonal cross section, thus with a plurality of vertices, thereby creating a plurality of edges along the attachment portion, the plurality of edges being a plurality of male portions. The cross section may be a square or rectangle for receiving four magnets, for a four poles motor. It may be as well a hexagon for receiving six magnets, thereby creating a six poles motor.

Advantageously, the support member has an attachment portion for attaching the plurality of magnets with a polygonal cross section, the polygonal cross section having an even number of sides, corresponding to a number of poles of the electric motor. If the polygon has four sides, the at least one support member will receive four magnets, and the electric motor will have four poles.

Advantageously, the rotor is comprising four magnets each comprising one cutout, the support member is a shaft of the rotor, with a cross section in a form of a square, the shaft thereby comprising four edges in a longitudinal direction, and each of the said edges engages into one of the said cutouts.

Advantageously, the magnets are glued onto the at least one support member. The invention makes a step of gluing easier, as during this step, it is critical to prevent movements until the glue provides an efficient attachment to the support member.

Advantageously, the rotor has an external diameter from about 1 mm to equal or smaller than 27 millimeters, and preferably equal or smaller than 20 millimeters. The invention provides a good positioning of the magnets, even for such low size where attachment by screws or positioning by pins or tang wedges is difficult or not possible.

Advantageously, the at least one male portion is a pin, or a tang wedge, or a spline. These embodiments are directed to large rotors, i.e. having an external diameter larger than 27 millimeters.

A second aspect of the invention is a stator of a rotative electric motor comprising the rotor and a stator, the stator comprising:

at least one support member, a plurality of magnets attached to and covering one inner surface of the at least one support member, the said plurality of magnets being adjacent to an air gap between the rotor and the stator, characterized in that:

one of the said inner surface and each of the said plurality of magnets comprises at least one male portion, the other of the said outer surface and each of the said plurality of magnets comprises at least one female portion, and in that the at least one male portion is engaged into the at least one female portion, thereby providing a positioning of each of the said plurality of magnets to the at least one support member, at least during a step of attachment of each of the said plurality of magnets to the at least one support member.

In other words, the invention relates to a magnet assembly comprising at least one support member, a plurality of magnets, wherein each one of the plurality of magnets is positioned relatively to the at least one support member by a male-female interface. For each one of the plurality of magnets, a male portion is engaged into a female portion so that displacements during a step of attachment of each one of the plurality of magnets to the at least one support member are avoided.

A third aspect of the invention is an electric motor comprising one rotor according to the first aspect of the invention, or a stator according to the second aspect of the invention.

BRIEF DESCRIPTION OF THE DRAWINGS

Other characteristics and advantages of the present invention will appear more clearly from the following detailed description of particular non-limitative examples of the invention, illustrated by the appended drawings where.

DETAILED DESCRIPTION

Figure 1A:
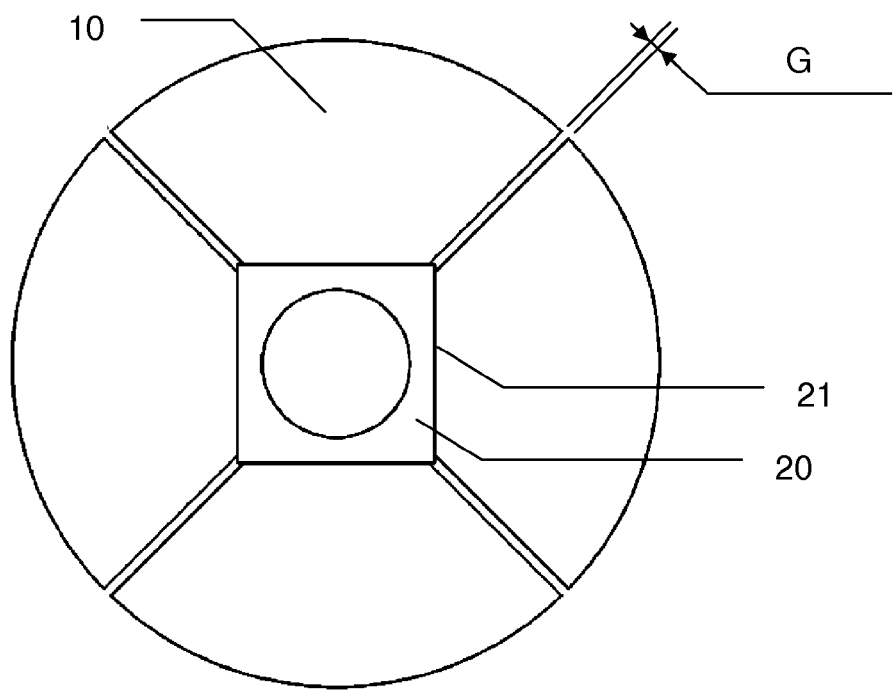
FIG. 1a represents a rotor of the prior art.

The rotor represented at FIG. 1 is a typical rotor for a brushless direct current motor. It comprises four magnets 10 attached to a shaft 20. The shaft 20 has typically two extremities (not shown) coupled to bearings, thereby enabling an easy rotation of the rotor relatively to a stator of the motor.

The shaft 20 has a cross section having a shape of a square with four sides 21, each forming a planar side onto which one of the magnets 10 is attached. The attachment of the magnets 10 onto the shaft 20 may be achieved by gluing, especially for small size rotors, i.e. those having an external diameter smaller than 27 millimeters. Indeed, for such low diameter rotors, other attachments such as screws are not easy to implement, due to the small space available.

Figure 1B:
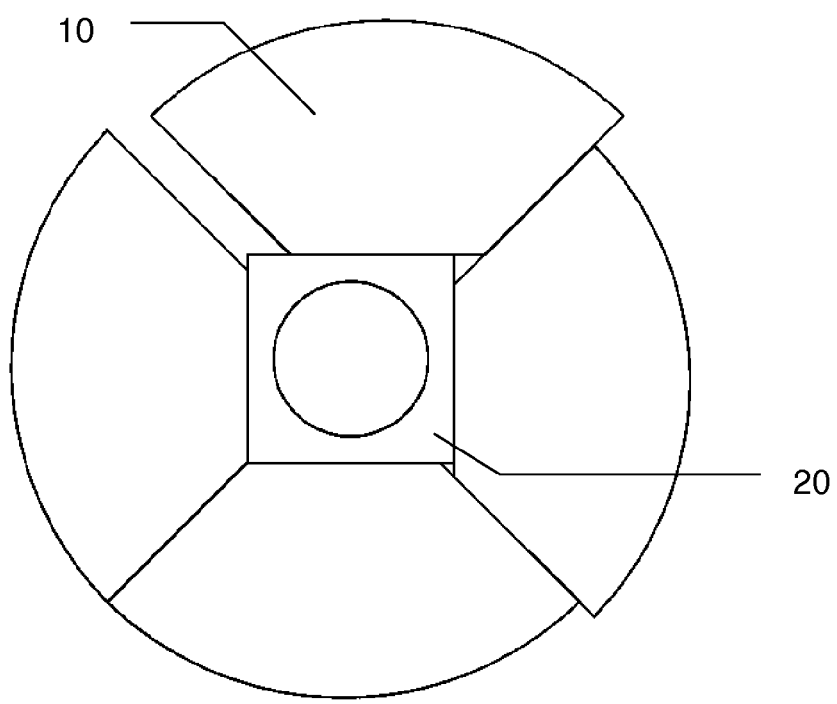
FIG. 1b represents the rotor of FIG. 1a, with a defect of assembly.

Each magnet 10 is manufactured with dimensional tolerances, and the assembly requires a minimum gap G as shown on FIG. 1 between the magnets 10. It should be noted that during the step of gluing the magnets 10 on the shaft 20, each magnet may move onto its attachment surface, thereby moving away or moving into the vicinity of an adjacent magnet 10. This leads to dimensional spreads, balancing issues and all in all, it has a negative impact of the magnetic field shape. FIG. 1b represents an example of defective assembly. Some magnets 10 have moved and the gap is not equal between each magnet 10, leading to unbalanced magnetic field and dimensional spreads for example.

Figure 2:
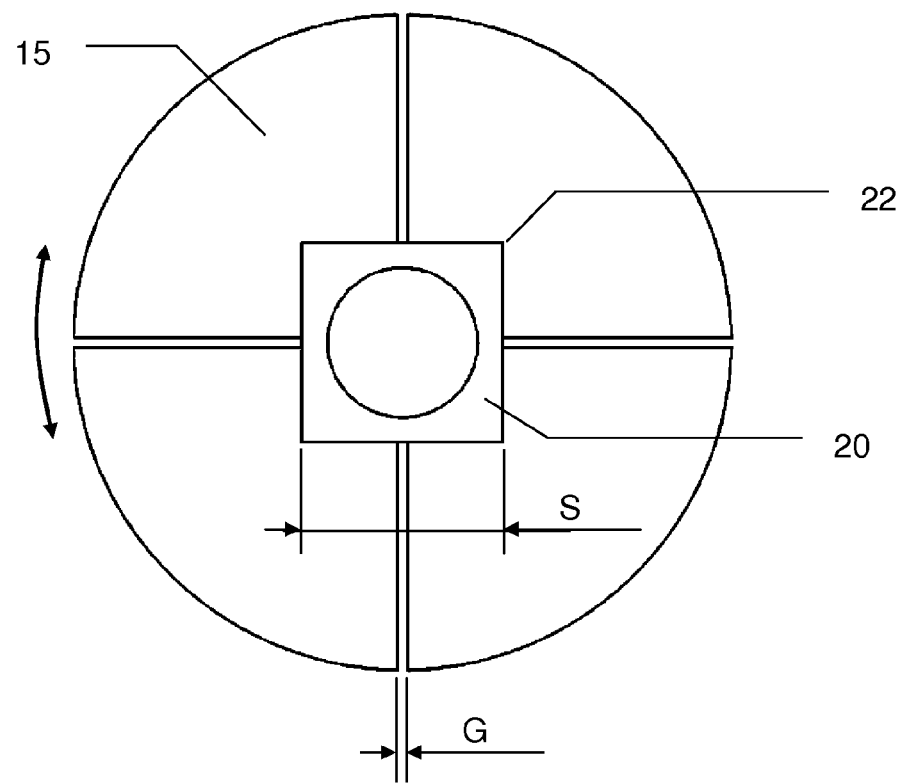
FIG. 2 represents a rotor according to the present invention.

The rotor according to the present invention on FIG. 2 comprises four magnets 15 and the same shaft 20 as the rotor of FIG. 1. However, each one of the magnets 15 comprises a cutout, so that each edge 22 of the shaft 20 can be engaged into one cutout of the magnets 15.

This engagement of the edges 22 (being male portions of the shaft 20) into the cutouts (being female portions) of the magnets 15 provides an abutment between each magnet 15 and the shaft 20, so that displacements in a tangential direction T are no longer possible. The gap G between each magnet 15 is achieved by machining the cutouts in each magnet 15, and displacements during the step of gluing are not possible if an inward radial force is applied to each magnet 15. It should be noted that this force may be generated by the magnet 15 itself due to the fact that magnets 15 are already magnetized before the gluing process, and the shaft 20 (support member) is made of magnetic material/steel.

Here, the rotor represented at FIG. 2 is dedicated to a four poles electric motor, but the invention may be useful for a six poles motor, where the shaft 20 may have a hexagonal cross section. It is also possible to design rotors according to the present invention, with an edge-cutout engagement, for electric motors with more than four or six poles motors.

It is also possible to design a stator according to the present invention, with a male-female engagement between stator magnets and a support member of the stator (a frame of the stator for example).

Figure 3:
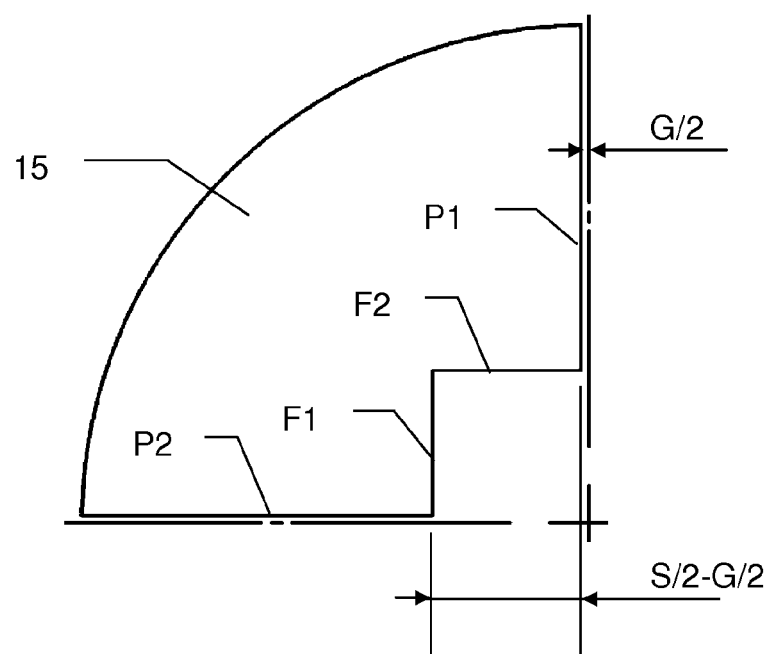
FIG. 3 represents one magnet of the rotor of FIG. 2.

FIG. 3 is showing a magnet 15 alone. The magnet 15 is an elongated part having a cross section in the general shape of a quarter of a disc with two planes P1, P2 being oriented at 90° and joining the external radius of the magnet 15. The cutout is made by machining two faces F1, F2 respectively parallels to the planes P1, P2 along the central line of the magnet 15. To achieve the gap G for the rotor of FIG. 2, each face F1, F2 has to be machined at a distance D of its respective plane P1, P2 being half of the side S of the square of the shaft 20, minus half of gap G:

$$D = S/2 - G/2$$

Of course, this is the nominal distance D, tolerances have to be taken into account for mass production. In addition, it must be borne in mind that internal radiuses are present at the intersections of faces F1 and F2, leading to the necessity of chamfering each edge of the shaft 20 of FIG. 2. These details are not represented, as they are well known from the one skilled in the art.

Figure 4:
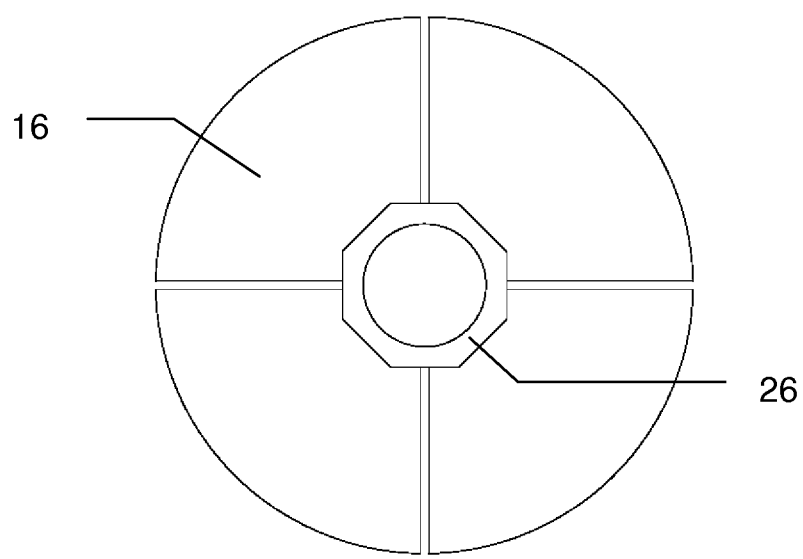
FIG. 4 represents a second embodiment of a rotor according to the present invention.

The FIG. 2 represents a shaft 20 having a square cross section for a four poles motor, but, as shown on FIG. 4, a rotor according to the invention may comprise a shaft 26 which also has an octagon cross section for supporting four magnets 16, still for a four poles motor. Each magnet 16 has a cut out corresponding to a quarter of an octagon, resulting into a male-female coupling between the shaft 26 and each of the magnets 16.

It is understood that obvious improvements and/or modifications for one skilled in the art may be implemented and are under the scope of the invention as it is defined by the appended claims. In particular, it is shown on FIG. 2 that the magnets 15 are in contact with the shaft 20 through the entire faces F1, F2, but it may be contemplated to have contacts between these parts through reduced surfaces, which still define a general male-female interface. It is also mentioned that the cutouts are machined in the parts, but it may be encompassed to mold or sinter the parts directly with their final shape including a male/female portion.

The invention claimed is:

1. Rotor of an electric motor comprising the rotor and a stator, the rotor comprising:
    at least one support member,
    a plurality of magnets attached to and covering one outer surface of the at least one support member, the plurality of magnets being adjacent to an air gap between the rotor and the stator, wherein
    one of the outer surface of the support member and each of the plurality of magnets comprises at least one male portion,
    the other of the outer surface of the support member and each of the plurality of magnets comprises at least one female portion, and
    at least one male portion is engaged with at least one female portion, thereby providing a positioning of each of the plurality of magnets to the at least one support member, at least during a step of attachment of each of the plurality of magnets to the at least one support member, and
    wherein the support member has an attachment portion for attaching the plurality of magnets with a polygonal cross section, the polygonal cross section having an even number of sides corresponding to a number of poles of the electric motor, and wherein the rotor has an external diameter from about 1 mm to about 27 mm.

2. The rotor according to claim 1, wherein the at least one male portion comprises an edge, and wherein the at least one female portion comprises a cutout which is complementary to the edge.

3. The rotor according to claim 1, wherein the at least one male portion provides an abutment onto the at least one support member for each one of the plurality of magnets in a direction of application of a magnetic force created by the other magnets of the plurality of magnets.

4. The rotor according to claim 1, wherein the at least one support member is a shaft of the rotor having an elongated attachment portion for the plurality of magnets with a polygonal cross section.

5. The rotor according to claim 1, comprising four magnets each comprising one cutout, wherein the support member is a shaft of the rotor, with a cross section in a form of a square and having four edges in a longitudinal direction, and wherein each of the edges engages with one of the said cutouts.

6. The rotor according to claim 1, wherein the magnets are fixed onto the at least one support member.

7. The rotor according to claim 1, wherein the at least one male portion is a pin, a tang wedge, or a spline.

8. An electric motor comprising the rotor according to claim 1.

* * * * *